United States Patent

[11] 3,588,658

| [72] | Inventors | Peter C. Van Der Sluys<br>Wayne;<br>George E. Ellis, Franklin Lakes, N.J.; Louis Levine, Bronx, N.Y.; Fred P. Modrow, Union, N.J. |
|---|---|---|
| [21] | Appl. No. | 786,064 |
| [22] | Filed | Dec. 23, 1968 |
| [45] | Patented | June 28, 1971 |
| [73] | Assignee | The Bendix Corporation |

[54] SERVO SYSTEM HAVING A MONITOR AND TRIP LEVEL TEST MEANS
12 Claims, 1 Drawing Fig.

[52] U.S. Cl. .................................................. 318/563, 318/565
[51] Int. Cl. ............................................... G05b 9/02
[50] Field of Search ...................................... 318/20.0, 20.080, 490

[56] References Cited
UNITED STATES PATENTS

| 2,850,689 | 9/1958 | Hansburg et al. | 318/490X |
| 3,166,691 | 1/1965 | McGee | 318/28X |
| 3,412,280 | 11/1968 | De Grande | 318/18 |
| 3,439,228 | 4/1969 | Gormley | 318/18X |

*Primary Examiner*—Benjamin Dobeck
*Attorney*—Plante, Hartz, Smith and Thompson

ABSTRACT: A condition indicator operated by a servo means, having a servoamplifier and a monitor, indicates a sensed condition. The monitor provides an alarm when a specified difference exists between the sensed condition and the indicated condition. A test means shorts the servo means input to ground and applies a voltage to the servo means to operate the servo until the monitor provides the alarm. The monitor trip level can be determined by reading the change in reading of the indicator during the test.

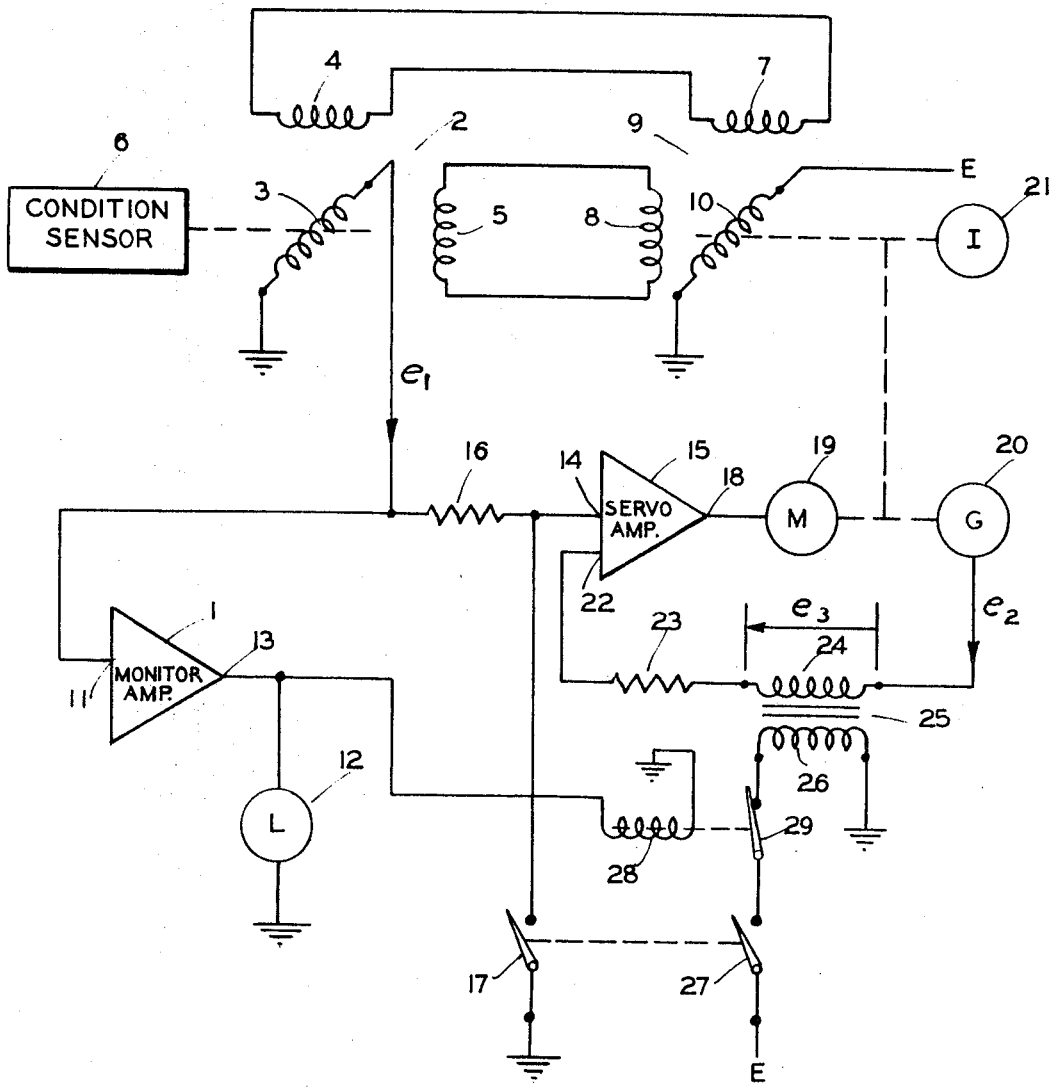

SERVO SYSTEM HAVING A MONITOR AND TRIP LEVEL TEST MEANS

BACKGROUND OF THE INVENTION

1. Field of the Invention

This invention relates to servosystems and more particularly to a system having a monitor with means for testing the monitor trip level.

2. Description of the Prior Art

Heretofore servo monitor level tests in precision servosystems have only been performed in laboratory environments. Thus they are costly and time consuming.

One method for accurately testing servo monitor trip level requires the servoamplifier to be disconnected and the gear train locked. The input device is displaced till the monitor fires at which time the displacement of the input device equals the trip level. Firstly, disconnecting the servoamplifier charges loading on the signal source thus effecting the amplitude and phase of the monitor input signal. Secondly, precision equipment is needed to measure the displacement of the input device especially devices having minute motion, such as pressure sensing devices. Thirdly, the gear train must be locked necessitating access to the gear train which is usually in a sealed container.

Another method also requires disconnecting the servo amplifier but with this method the gear train is manually rotated until the servo monitor fires. The trip level is measured by reading the displacement of the output indicator. This method is also subject to the problems caused by disconnecting the amplifier and access to the gear train.

SUMMARY OF THE INVENTION

The present invention contemplates a servosystem having a servo means, a monitor and a test circuit for testing the trip level of the monitor. An indicator follows a sensed condition and the monitor senses a difference between the sensed condition and the indicated condition and provides an alarm if a trip level is exceeded. Upon activation of the trip level test the sensed condition is isolated from the servo means and a voltage is applied to the servo means which causes the servo to operate. As the servo operates the error between the sensed condition and the indicated condition increases. The monitor provides an alarm when the difference corresponds to the trip level of the monitor amplifier. The trip level is read as the change in reading of the indicator during the test.

One object of the invention is to test monitor trip level without external equipment.

Another object of the invention is to test monitor trip level without disconnecting servo components.

Another object of the invention is to test monitor trip level without access to sealed mechanism. Another object of the invention is to test servo monitor trip level in its operating environment.

DESCRIPTION OF THE DRAWING

In the drawing there is shown a schematic diagram of a servosystem constructed according to the present invention.

DESCRIPTION OF THE INVENTION

Referring to the drawing there is shown an embodiment of the invention used to test the trip level of a servo monitor amplifier 1. A condition sensor 6 is responsive to a condition and is mechanically connected to a rotor 3 of a resolver 2 having stator windings 4 and 5. Rotor 3 is angularly displaced in accordance with the condition. Stator windings 4 and 5 are connected to and energized by stator windings 7 and 8 respectively, of a resolver 9 having a rotor 10. Rotor 10 is energized by an AC voltage E. Rotor 3 has one end connected to ground and the other end connected to an input 11 of monitor amplifier 1 and providing a signal $e_1$ corresponding to the difference between the positions of rotors 3 and 10. A warning lamp 12 is connected between an output 13 of monitor amplifier 1 and ground. A relay coil 28 is connected in parallel with lamp 12.

An input 14 of a servo amplifier 15 is connected to the other end of rotor 3 through a resistor 16. Input 14 is also connected to a normally open switch 17 which is connected to ground. Servoamplfiier 15 has an output 18 connected to a motor 19 for energizing the motor. The motor 19 is driveably connected to a generator 20, an indicator 21 and the rotor 10. Generator 20 provides a rate signal $e_2$ and is connected to a rate feedback input 22 of amplifier 15 through rate resistor 23 and a secondary winding 24 of a transformer 25. Transformer 25 has a primary winding 26 having one end connected to ground and another end connected to an AC voltage E through a normally closed set of relay contacts 29 and a normally open switch 27.

During normal operation the movement of rotor 3 by the condition sensor 6 is imparted to rotor 10 by the followup action of the servosystem and the position of rotor 10 is indicated by indicator 21. When the system is functioning properly the positions of rotors 3 and 10 will correspond and signal $e_1$ will nearly equal zero. If a malfunction occurs and rotor 10 does not follow rotor 3 signal $e_1$ increases with the difference between the two rotors. When signal $e_1$ reaches a level corresponding to the trip level, monitor amplifier 1 produces an output voltage which lights lamp 12 thereby indicating the difference exceeds the trip level.

When the trip level of the monitor amplifier is tested both switches 17 and 27 are simultaneously closed. Switch 17 grounds input 14 of servoamplifier 15 while a load for signal $3_1$ is provided by resistor 16. Switch 27 connects AC voltage E to the primary 26 of transformer 25. Transformer 25 steps down the AC voltage and couples it to the secondary winding 24 as a signal $e_3$. Servoamplifier 15 is responsive to signal $e_3$ to drive motor 19. As the motor rotates rotor 10 signal $e_1$ increases and corresponds to the difference between rotor 10 and rotor 3. When this error corresponds to the monitor trip level the monitor causes lamp 12 to light and also activates relay coil 28 which in turn opens contacts 29 stopping the motor.

To determine the trip level the position of the indicator 21 is noted and switches 17 and 27 are closed when the condition is stable. When the lamp lights and the servo stops the indicator position is again noted and the trip level is determined by subtracting the two indicator readings.

If the rate generator is not desired the signal $e_3$ can be applied directly to input 14 if signal $e_1$ is isolated from the input. It is only necessary to apply some voltage to cause the motor to rotate this voltage can also be applied directly to the motor.

Relay coil 28 and relay contact 29 may be eliminated if the servo is driven at a rate sufficiently slow to allow accurate reading of the indicator when lamp 12 is lighted. In this configuration the motor will not stop when the trip level is reached.

A slow rotation may be achieved by applying a voltage of sufficient level to just cause rotation. If the voltage is applied in series with the rate generator output the motor rotates at a rate sufficient to cause generator 20 to generate signal $e_2$ which nearly cancels signal $e_3$. In this manner the rotation rate is accurately controlled by the level of signal $e_3$.

Thus the present invention enables the monitor trip level of a servosystem to be tested without additional test equipment. The test can be performed without disconnecting components or requiring access to sealed mechanisms and it can be performed in the operational environment of the system.

We claim:

1. A servo system comprising:
   means for sensing a condition;
   an indicator for indicating the condition;
   servo means having an input connected to the sensing means and an output connected to the indicator for operating the indicator to correspond to the condition;
   a monitor connected to the sensing means and to the indicating means for detecting a difference between the sensed condition and the indicated condition and providing an alarm when the difference exceeds a trip level; and test means for testing the trip level of the monitor including means for operating the servo means until the monitor provides an alarm whereby the trip level of the monitor corresponds to the change in reading of the indicator during the test.

2. A servosystem as described in claim 1, in which:
the servo means includes, a servomotor driveably connected to the indicator; and
the test means includes, means for applying a voltage to operate the servomotor.

3. A servosystem as described in claim 1, which includes:
means for providing a signal corresponding to the indicated condition;
means for providing a signal corresponding to the sensed condition; and
means for providing a signal corresponding to a difference between the sensed condition signal and the indicated condition signal, the servo means being responsive to the difference signal.

4. A servosystem as described in claim 3, in which the servo means includes:
a motor driveably connected to the indicator; and
a generator driveably connected to the motor having an output providing a rate signal in opposition to the difference signal.

5. A servosystem as described in claim 4, in which test means includes:
means for causing the servo means to be nonresponsive to the difference signal; and
means for providing a voltage in opposition to the rate signal for operating the motor.

6. A servosystem as described in claim 3, in which the servo means includes:
a servoamplifier having an input connected to the difference means for amplifying the difference signal;
a motor connected to the servoamplifier and driveably connected to the indicator for positioning the indicator; and
a generator driveably connected to the motor and having an output connected to the amplifier and providing a rate signal in opposition to the difference signal.

7. A servosystem as described in claim 6, in which the test means includes:
means for isolating the difference signal from the servoamplifier during the test; and
means for providing a voltage in opposition to the rate signal for operating the motor.

8. A servosystem as described in claim 3, in which the monitor includes an operational amplifier responsive to the difference signal and having an output for providing the alarm when the signal exceeds the trip level.

9. A servosystem as described in claim 6, in which the test means comprises:
means for disconnecting the difference signal from the servoamplifier input and grounding it through a load; and
means for applying a voltage to the servoamplifier input to cause the motor to displace the position indicator.

10. A servosystem as described in claim 9, in which the servoamplifier has a rate input to which the voltage is applied to cause the motor to displace the position indicator at a substantially constant rate.

11. A servosystem described in claim 7, in which the voltage is applied by a transformer having a secondary winding connected in series with the rate generator output.

12. A method of determining the trip level of a servo monitor which provides an alarm when detecting a signal used to control a servo means and corresponding to a difference between a sensed condition and the indication on an indicator operated by the servo comprising the following steps:
rendering the servo means uncontrolled by the signal when the condition is stable;
operating the servo means independently of the signal to change the indication and increase the difference sufficiently to cause the monitor to provide an alarm; and
reading the change in indication on the indicator said change corresponding to the trip level.

UNITED STATES PATENT OFFICE
CERTIFICATE OF CORRECTION

Patent No. 3,588,658　　　　　　　　　Dated　June 28, 1971

Inventor(s)　Peter C. Van Der Sluys et al.

It is certified that error appears in the above-identified patent and that said Letters Patent are hereby corrected as shown below:

On the cover sheet [72], "Fred P. Modrow" should read -- Fred P. Modrowsky --.

Signed and sealed this 1st day of August 1972.

(SEAL)
Attest:

EDWARD M. FLETCHER, JR.　　　　　　　　　ROBERT GOTTSCHALK
Attesting Officer　　　　　　　　　　　　Commissioner of Patents

FORM PO-1050 (10-69)